(12) United States Patent
Krych et al.

(10) Patent No.: US 12,017,722 B2
(45) Date of Patent: Jun. 25, 2024

(54) FUEL TANK FASTENING ASSEMBLY FOR A MOTORCYCLE, AND MOTORCYCLE ASSEMBLY

(71) Applicant: Bayerische Motoren Werke Aktiengesellschaft, Munich (DE)

(72) Inventors: Tim Krych, Munich (DE); Martin Pazulla, Wolfratshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 429 days.

(21) Appl. No.: 17/285,686

(22) PCT Filed: Sep. 10, 2019

(86) PCT No.: PCT/EP2019/074078
§ 371 (c)(1),
(2) Date: Apr. 15, 2021

(87) PCT Pub. No.: WO2020/083558
PCT Pub. Date: Apr. 30, 2020

(65) Prior Publication Data
US 2021/0316805 A1 Oct. 14, 2021

(30) Foreign Application Priority Data
Oct. 25, 2018 (DE) ..................... 10 2018 126 584.0

(51) Int. Cl.
*B62J 35/00* (2006.01)
*B62J 43/20* (2020.01)
*B62K 11/02* (2006.01)

(52) U.S. Cl.
CPC .............. *B62J 35/00* (2013.01); *B62J 43/20* (2020.02); *B62K 11/02* (2013.01)

(58) Field of Classification Search
CPC ............ B62K 11/02; B62J 35/00; B62J 43/20
See application file for complete search history.

(56) References Cited

U.S. PATENT DOCUMENTS 5,172,788 A * 12/1992 Fujii ...................... B62K 19/46
180/219
6,053,533 A 4/2000 Osborn et al.
(Continued)

FOREIGN PATENT DOCUMENTS

CN 101468694 A 7/2009
CN 104369810 A 2/2015
(Continued)

OTHER PUBLICATIONS

International Search Report (PCT/ISA/210) issued in PCT Application No. PCT/EP2019/074078 dated Feb. 3, 2020 with English translation (seven (7) pages).
(Continued)

*Primary Examiner* — Kevin Hurley
*Assistant Examiner* — Michael R Stabley
(74) *Attorney, Agent, or Firm* — Crowell & Moring LLP

(57) ABSTRACT

A fuel tank fastening assembly for a motorcycle includes a fuel tank, a holding bracket secured to the fuel tank, and a battery carrier. The holding bracket is fastened to a mount on the battery carrier. A motorcycle assembly includes the fuel tank fastening assembly and a motorcycle frame. The battery carrier of the fuel tank fastening assembly is fastened to the motorcycle frame, and a battery is accommodated and secured in the battery carrier.

12 Claims, 4 Drawing Sheets

(56) References Cited

U.S. PATENT DOCUMENTS

| | | | |
|---|---|---|---|
| 7,549,675 B2* | 6/2009 | Satake | B62K 19/30 |
| | | | 180/219 |
| 7,712,564 B2* | 5/2010 | Schmidt | F02M 35/10013 |
| | | | 180/219 |
| 8,616,324 B2* | 12/2013 | Chipp | B62K 19/30 |
| | | | 180/311 |
| 10,556,635 B2* | 2/2020 | Murayama | B62K 11/02 |
| 2005/0006162 A1* | 1/2005 | Philipps | B62J 35/00 |
| | | | 180/219 |
| 2006/0065457 A1* | 3/2006 | Miyabe | B62K 11/04 |
| | | | 180/219 |
| 2008/0083577 A1 | 4/2008 | Schmidt et al. | |
| 2009/0008900 A1 | 1/2009 | Ishikawa et al. | |
| 2009/0014091 A1 | 1/2009 | Kobayashi et al. | |
| 2010/0193275 A1 | 8/2010 | Song et al. | |
| 2016/0090140 A1 | 3/2016 | Mizukura et al. | |
| 2018/0148117 A1* | 5/2018 | Murayama | B62J 35/00 |
| 2018/0339739 A1* | 11/2018 | Kondo | B62J 25/06 |
| 2018/0339745 A1* | 11/2018 | Nakamura | B60T 8/3685 |

FOREIGN PATENT DOCUMENTS

| | | |
|---|---|---|
| CN | 207651572 U | 7/2018 |
| DE | 10 2007 048 355 A1 | 4/2008 |
| DE | 10 2017 219 422 A1 | 5/2018 |
| EP | 0 751 063 A1 | 1/1997 |
| EP | 2 030 883 A1 | 3/2009 |
| JP | 2-28084 A | 1/1990 |
| JP | 2001-233270 A | 8/2001 |
| JP | 2001233270 A * | 8/2001 |
| JP | 2009-18755 A | 1/2009 |
| JP | 2013-136978 A | 7/2013 |
| JP | 2015-36272 A | 2/2015 |
| WO | WO 2010/080291 A1 | 7/2010 |
| WO | WO 2018/179299 A1 | 10/2018 |

OTHER PUBLICATIONS

German-language Written Opinion (PCT/ISA/237) issued in PCT Application No. PCT/EP2019/074078 dated Feb. 3, 2020 (five (5) pages).

German-language Search Report issued in German Application No. 10 2018 126 584.0 dated Jan. 25, 2021 with partial English translation (13 pages).

English translation of Chinese-language Office Action issued in Chinese Application No. 201980050313.9 dated Dec. 7, 2023 (9 pages).

* cited by examiner

FUEL TANK FASTENING ASSEMBLY FOR A MOTORCYCLE, AND MOTORCYCLE ASSEMBLY

BACKGROUND AND SUMMARY OF THE INVENTION

The present invention relates to a fuel tank fastening assembly for a motorcycle and to a motorcycle assembly having a fuel tank fastening assembly.

In order to fasten a fuel tank in motorcycles, separate holders are usually provided. These holders bridge a gap between the fuel tank and a motorcycle frame and allow the fuel tank to be fastened to the frame.

A drawback here is that the additional holders result in a great amount of effort during mounting and high production costs.

Consequently, it is an object of the present invention to specify a fuel tank fastening assembly that allows easy and cost-effective mounting of the fuel tank on a motorcycle, in particular on a motorcycle frame.

This object is achieved according to the invention by a fuel tank fastening assembly for a motorcycle, having a fuel tank, a holding bracket fastened to the fuel tank, and a battery carrier, wherein the holding bracket is fastened to the battery carrier.

As a result of the fuel tank being fastened to the battery carrier, no additional holders are necessary in order to mount the fuel tank. In particular, the battery carrier, which can be mounted on a motorcycle frame, assumes the function of a holder and bridges a distance between the fuel tank and the motorcycle frame, such that the fuel tank is fastened to the motorcycle frame via the battery carrier.

In this way, fewer components are required for mounting the fuel tank, this having a positive effect on mounting effort and manufacturing costs. In addition, on account of the reduced number of components, greater tolerance accuracy can be achieved.

According to one embodiment, the holding bracket is welded to the fuel tank. As a result, a particularly stable connection between the holding bracket and the fuel tank can be achieved.

A mount may be integrally formed on the battery carrier, the holding bracket being fastened, in particular screwed, to the mount. By means of the mount, the fuel tank can be fastened to the battery carrier particularly easily, and the battery carrier fulfills the additional fastening function in a simple manner, without additional components being required.

The mount preferably comprises two receiving lugs that each have a through-hole through which a fastening means for fastening the holding bracket is mounted. The holding bracket with the fuel tank fastened thereto can, in this way, be positioned and mounted particularly easily and reliably.

According to a preferred embodiment, the holding bracket comprises a portion bent in a U shape, wherein the receiving lugs are arranged between the lateral limbs of the U-shaped portion in the mounted state of the fuel tank fastening assembly. Consequently, the holding bracket can be aligned with the receiving lugs during the mounting of the fuel tank.

For fastening, the holding bracket preferably likewise has through-holes, in particular on the lateral limbs of the holding bracket, wherein the through-holes are arranged such that, in a properly mounted state of the fuel tank fastening assembly, they are aligned with the through-holes of the receiving lugs. The fastening means can thus be fitted through the through-holes of the holding bracket and of the receiving lugs, in order to fasten the holding bracket to the battery carrier.

A rubber grommet, for example, is fitted in each of the through-holes of the receiving lugs. The rubber grommet is preferably shaped such that a part of the rubber grommet is arranged between the holding bracket and the receiving lug. In this way, unintentional twisting of the holding bracket is avoided, since the rubber grommet generates increased friction between the holding bracket and the receiving lug. Rather than a rubber grommet, other elements are also conceivable, which generate increased friction between the holding bracket and the receiving lug, for example rubber washers or the like.

According to one embodiment, a spacer sleeve is arranged between the receiving lugs, wherein the fastening means extends through the spacer sleeve in order to fasten the holding bracket in the mounted state. As a result of the spacer sleeve, the receiving lugs are supported during and after mounting and the receiving lugs are prevented from being damaged or breaking if, for example, the fastening means is tightened too much.

In order to achieve a firm connection between the holding bracket and the battery carrier, in particular the mount of the battery carrier, a plug-in nut is fitted for example on the holding bracket, wherein the fastening means is screwed in the plug-in nut. It is also conceivable for the holding bracket, in an alternative embodiment, to have, rather than a through-hole, a threaded bore, into which the fastening means can be screwed. As a further alternative, rather than a plug-in nut, a conventional nut can be used in order to fasten the holding bracket.

The battery carrier is preferably a plastics component. In a plastics component, additional fastening geometries, for example the receiving lugs, can be integrally formed particularly easily. This has only a slight impact on the component costs.

The battery carrier is for example trough-like and comprises a receptacle for a battery and, preferably, additionally a receptacle for an ABS module and/or a level detector. As a result of the trough shape, the battery carrier can be adapted to a shape of the battery and the battery can be mounted in particular fully within the trough-like battery carrier. Thus, if necessary, the battery carrier prevents the battery from being damaged.

The object is also achieved by a motorcycle assembly having a fuel tank fastening assembly, which is configured as described above, and having a motorcycle frame, wherein the battery carrier of the fuel tank fastening assembly is fastened to the motorcycle frame and the battery is accommodated and fastened in the battery carrier. A motorcycle assembly configured in such a way results in stable and cost-effective fastening both of the battery and of the fuel tank.

Further advantages and features of the invention will become apparent from the following description and from the following drawings, to which reference is made.

DETAILED DESCRIPTION OF THE DRAWINGS

Figure 1:
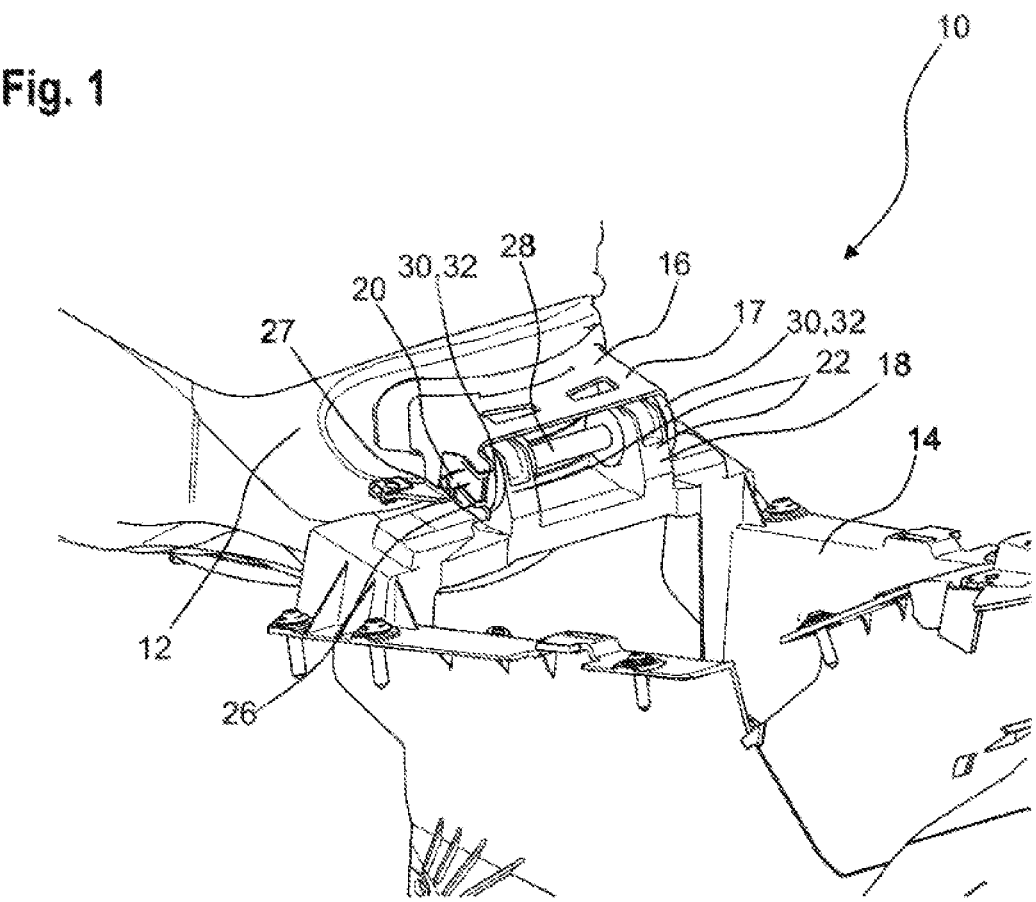
FIG. 1 shows a fuel tank fastening assembly according to an embodiment of the invention in a mounted state.

FIG. 1 shows an isometric view of a fuel tank fastening assembly 10 according to and embodiment of the invention for a motorcycle.

The fuel tank fastening assembly 10 comprises a fuel tank 12 and a battery carrier 14. Fastened, in particular welded, to the fuel tank 12 is a holding bracket 16. In the figures, for the sake of simplicity, only a part of the fuel tank 12 is illustrated.

In the exemplary embodiment shown, the holding bracket 16 is a bent sheet-metal part and comprises a portion 17 bent in a U shape.

The holding bracket 16 fastened to the fuel tank 12 is fastened, in particular screwed, to the battery carrier 14 by means of a fastening means 20.

For this purpose, the battery carrier 14 has a mount 18, which is integrally formed on the battery carrier 14.

In order to allow the holding bracket 16 to be fastened to the battery carrier 14 particularly easily, the mount 18 has two receiving lugs 22 that each have a through-hole 24. The through-holes 24 can be seen in FIG. 2, in which a separate view of the battery carrier 14 is illustrated.

The holding bracket 16 has corresponding through-holes, which are aligned with the through-holes 24 of the mount 18 when the holding bracket 16 is arranged in a mounting position. The fastening means 20 can be fitted through the through-holes 24 of the mount 18 and of the holding bracket 16 in order to fasten the holding bracket 16.

In the exemplary embodiment shown, for fastening, a plug-in nut 26 is also provided, which is fitted on the holding bracket 16. As a result of the fastening means 20 being screwed into the plug-in nut 26, the holding bracket 16 is fixed firmly to the battery carrier 14.

As can be seen in FIG. 1, the receiving lugs 22 are arranged, in the mounted state of the fuel tank fastening assembly 10, between the lateral limbs 27 of the U-shaped portion 17 of the holding bracket 16.

In order to avoid the mount 18 being damaged when the fastening means 20 is tightened, a spacer sleeve 28 is provided. The spacer sleeve 28 prevents the receiving lugs 22 from being damaged or breaking off as a result of the fastening means 20 being tightened too much.

Furthermore, rubber grommets 30 are provided, which are each fitted in the through-holes 24 of the receiving lugs 22. The rubber grommets 30 each have a collar 32, which is arranged between the holding bracket 16, in particular a lateral limb 27 of the holding bracket 16, and a receiving lug 22. As a result of the rubber grommets 30, unintentional twisting of the holding bracket 16 is avoided, since the rubber grommets 30 generate increased friction between the holding bracket 16 and the mount 18.

Figure 2:
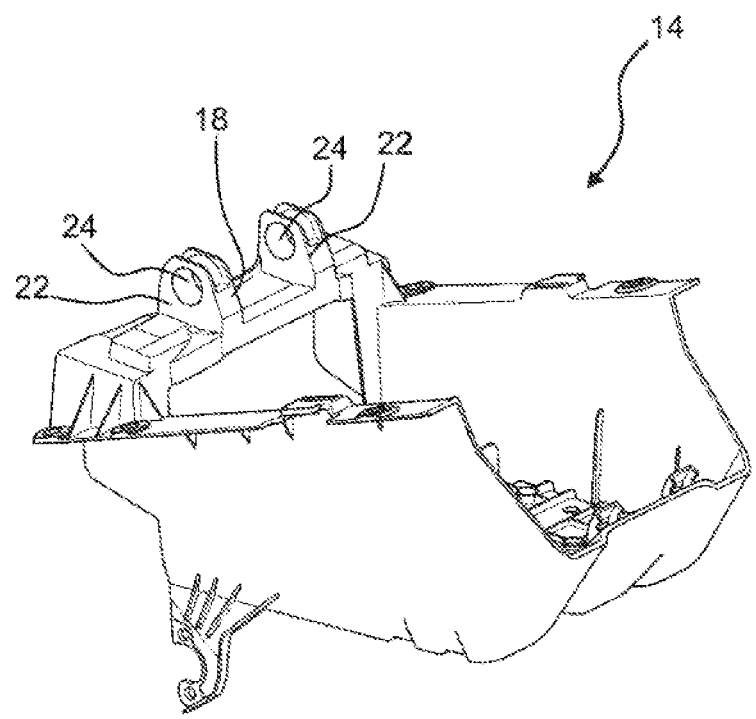
FIG. 2 shows the battery carrier of the fuel tank fastening assembly of FIG. 1.

FIG. 2 shows an isometric view of the battery carrier 14, which is trough-like.

The battery carrier 14 is a plastics component, in particular an injection-molded plastics component. As a result, complex geometries can be realized in the battery carrier 14. For example, the battery carrier 14, in addition to the mount 18, can have a receptacle for an ABS module and/or a level detector. These receptacles can be realized in the form of a recess or latching geometry, these not being illustrated in the figures for the sake of simplicity.

Figure 3:
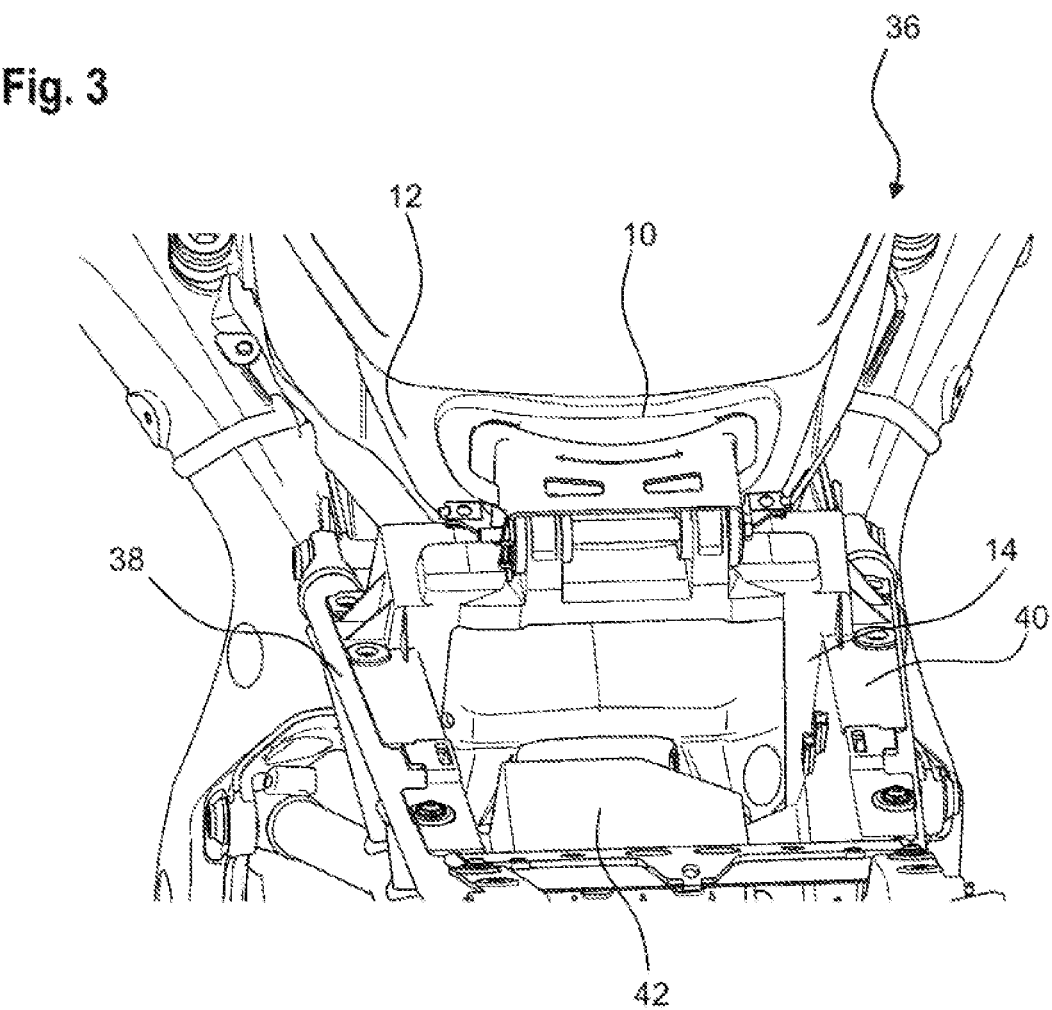
FIG. 3 shows a plan view of a motorcycle assembly according to an embodiment of the invention.

FIG. 3 shows a motorcycle assembly 36 having a fuel tank fastening assembly 10.

The motorcycle assembly 36 furthermore comprises a motorcycle frame 38, to which the battery carrier 14 of the fuel tank fastening assembly 10 is fastened, in particular screwed. For this purpose, fastening webs 40 are integrally formed on the battery carrier 14.

A battery 42 is accommodated and fastened in the battery carrier 14.

Figure 4:
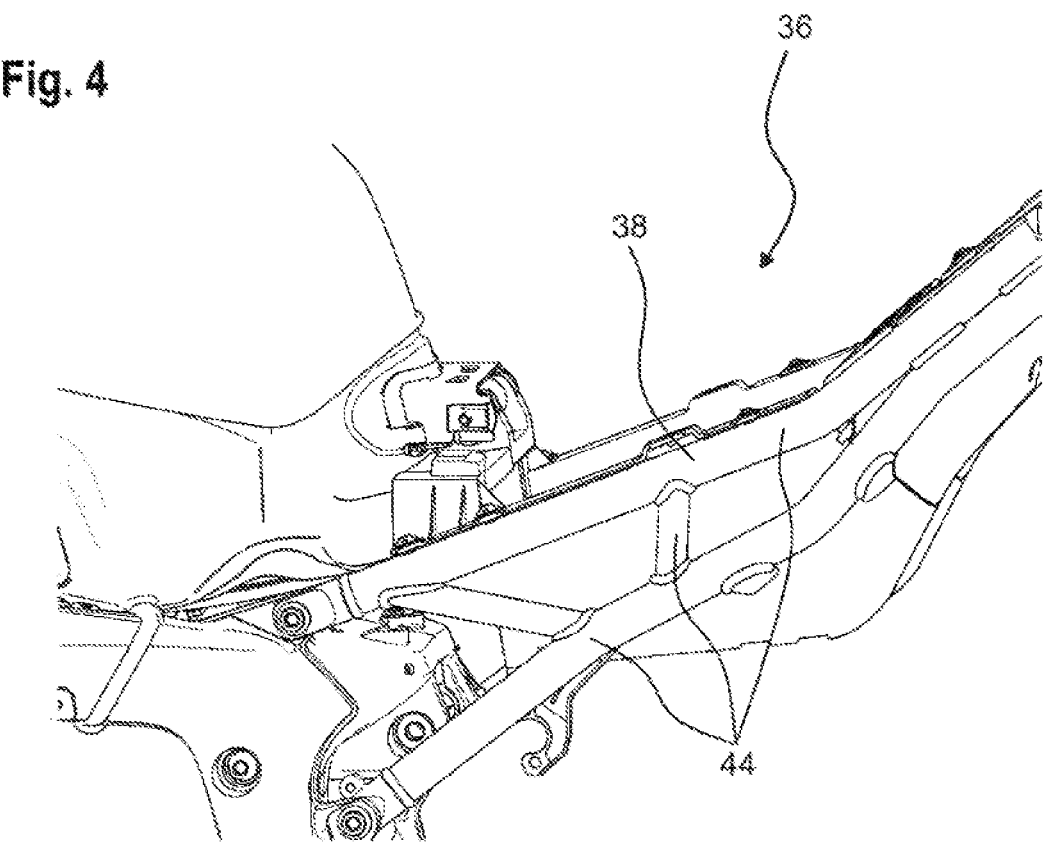
FIG. 4 shows a side view of the motorcycle assembly from FIG. 3.

FIG. 4 shows a side view of the motorcycle assembly 36. In this view, the motorcycle frame 38 is particularly clearly apparent.

The motorcycle frame 38 forms a supporting chassis of a motorcycle and is manufactured preferably from steel. In particular, the motorcycle frame 38 comprises a plurality of welded-together struts 44.

What is claimed is:

1. A fuel tank fastening assembly for a motorcycle, comprising:
    a fuel tank;
    a holding bracket attached to the fuel tank; and
    a battery carrier having a trough-shape and including a receptacle for a battery, and
    a mount integrally formed on the battery carrier, wherein
        the holding bracket is configured to be fastened to the battery carrier,
        the mount is configured to receive at least a portion of the holding bracket and to receive a fastener configured to fix the holding bracket to the mount,
        the mount includes two receiving lugs, each receiving lug having a through-hole through which the fastener passes to fix the holding bracket to the mount.

2. The fuel tank fastening assembly according to claim 1, wherein
    the holding bracket is welded to the fuel tank.

3. The fuel tank fastening assembly according to claim 1, wherein
    the portion of the holding bracket is U-shaped, and
    the receiving lugs are configured to be arranged between lateral limbs of the U-shaped portion when the fuel tank is in a mounted state.

4. The fuel tank fastening assembly according to claim 3, further comprising:
    a spacer sleeve, where in the mounted state of the fuel tank, the spacer sleeve is arranged between the two receiving lugs such that the fastener passes through the spacer sleeve and supports the two receiving lugs as the lateral limbs of the U-shaped portion of the holding bracket is fixed to the mount.

5. The fuel tank fastening assembly according to claim 4, wherein
    a plug-in nut located on the holding bracket is configured to receive the fastener at one of the lateral limbs opposite the other of the lateral limbs through which the fastener is first inserted.

6. The fuel tank fastening assembly according to claim 1, further comprising:
    a spacer sleeve, where in a mounted state of the fuel tank, the spacer sleeve is arranged between the two receiving lugs such that the fastener passes through the spacer sleeve and supports the two receiving lugs as lateral limbs of the U-shaped portion of the holding bracket is fixed to the mount.

7. The fuel tank fastening assembly according to claim 6, wherein
    a plug-in nut located on the holding bracket is configured to receive the fastener at one of the lateral limbs opposite the other of the lateral limbs through which the fastener is first inserted.

8. The fuel tank fastening assembly according to claim 1, wherein
the battery carrier is a plastics component.
9. The fuel tank fastening assembly according to claim 1, wherein
the battery carrier further comprises a receptacle for an ABS module and/or a level detector.
10. The fuel tank fastening assembly according to claim 1, wherein the battery carrier trough-shape includes space to accommodate another component other than the battery.
11. A motorcycle assembly, comprising:
a motorcycle frame; and
a fuel tank fastening assembly having a fuel tank, a holding bracket attached to the fuel tank, and a battery carrier having a trough-shape, and a mount integrally formed on the battery carrier, wherein
the holding bracket is configured to be fastened to the battery carrier,
the mount is configured to receive at least a portion of the holding bracket and to receive a fastener configured to fix the holding bracket to the mount,
the mount includes two receiving lugs, each receiving lug having a through-hole through which the fastener passes to fix the holding bracket to the mount,
the battery carrier is fastened to the motorcycle frame, and
the battery carrier is configured to accommodate a battery.
12. The motorcycle assembly according to claim 11, wherein the holding bracket is welded to the fuel tank.

* * * * *